United States Patent
Lee et al.

(10) Patent No.: US 10,754,133 B2
(45) Date of Patent: Aug. 25, 2020

(54) CLOAKING DEVICES WITH CURVED MIRRORS

(71) Applicant: Toyota Motor Engineering & Manufacturing North America, Inc., Erlanger, KY (US)

(72) Inventors: Kyu-Tae Lee, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 231 days.

(21) Appl. No.: 15/660,007

(22) Filed: Jul. 26, 2017

(65) Prior Publication Data

US 2019/0033565 A1 Jan. 31, 2019

(51) Int. Cl.
*G02B 5/10* (2006.01)
*G02B 17/06* (2006.01)
*B60R 1/00* (2006.01)

(52) U.S. Cl.
CPC .......... *G02B 17/0621* (2013.01); *B60R 1/007* (2013.01); *B60R 2300/202* (2013.01);
(Continued)

(58) Field of Classification Search
CPC .................................................. G02B 17/06; G02B 17/0615; G02B 17/0621; G02B 17/0642; G02B 17/0647;
(Continued)

(56) References Cited

U.S. PATENT DOCUMENTS 4,886,348 A * 12/1989 Schmertz ........... G02B 17/0668
359/861
9,405,118 B1 8/2016 Lu
(Continued)

FOREIGN PATENT DOCUMENTS

CN 101811476 B 6/2011
CN 202345546 U 7/2012
(Continued)

OTHER PUBLICATIONS

Anthony, Sebastian, "The first three-dimensional visible light invisibility cloak", published/accessed: Sep. 29, 2014; URL: https://www.extremetech.com/extreme/191060-the-first-three-dimensional-visible-light-invisibility-cloak.
(Continued)

*Primary Examiner* — Stephone B Allen
*Assistant Examiner* — Jyotsna V Dabbi
(74) *Attorney, Agent, or Firm* — Dinsmore & Shohl LLP

(57) ABSTRACT

A cloaking device includes an object-side, an image-side, an object-side curved cloaking region (CR) boundary having an outward facing mirror surface and an inward facing surface, and an image-side curved CR boundary an outward facing mirror surface and an inward facing surface. A cloaked region is bounded by the inward facing surfaces of the object-side curved CR boundary and the image-side curved CR boundary. At least one exterior boundary with an inward facing mirror surface is spaced apart from the object-side curved CR boundary and the image-side curved CR boundary. Light from an object positioned on the object-side of the cloaking device and obscured by the cloaked region is redirected around the cloaked region to form an image of the object on the image-side of the cloaking device such that the light from the object appears to pass through the CR.

16 Claims, 8 Drawing Sheets

(52) U.S. Cl.
CPC ...... *G02B 17/0642* (2013.01); *G02B 17/0647* (2013.01); *G02B 2207/123* (2013.01)

(58) Field of Classification Search
CPC .......... G02B 17/0605; G02B 2207/123; B62D 25/04; B60R 1/10; B60R 1/007; B60R 2300/202
USPC ....................................... 359/858, 838, 857
See application file for complete search history.

(56) References Cited

U.S. PATENT DOCUMENTS

| | | |
|---|---|---|
| 9,557,547 B2 | 1/2017 | Choi et al. |
| 2003/0047666 A1 | 3/2003 | Alden |
| 2010/0309566 A1* | 12/2010 | DeWitt ................. G02B 5/001 359/729 |
| 2015/0183375 A1 | 7/2015 | Wu |

FOREIGN PATENT DOCUMENTS

| | | |
|---|---|---|
| CN | 203020203 U | 6/2013 |
| CN | 103287340 A | 9/2013 |
| CN | 203580786 U | 5/2014 |

OTHER PUBLICATIONS

"Physics demonstrations: cloaking device?", Apr. 25, 2013; URL: https://skullsinthestars.com/2013/04/25/physics-demonstrations-cloaking-device.

* cited by examiner

CLOAKING DEVICES WITH CURVED MIRRORS

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, an object-side curved cloaking region (CR) boundary having an outward facing mirror surface and an inward facing surface and an image-side curved CR boundary an outward facing mirror surface and an inward facing surface. A cloaked region is bounded by the inward facing surfaces of the object-side curved CR boundary and the image-side curved CR boundary. The cloaking device also includes at least one exterior boundary with an inward facing mirror surface spaced apart from the object-side curved CR boundary and the image-side curved CR boundary. Light from an object positioned on the object-side of the cloaking device and obscured by the cloaked region is redirected around the cloaked region to form an image of the object on the image-side of the cloaking device such that the light from the object appears to pass through the cloaked region. The at least exterior boundary may include an object-side exterior curved boundary and an image-side exterior curved boundary. The object-side exterior curved boundary comprises an inward facing mirror surface positioned proximate to and facing the outward facing mirror surface of the object-side curved CR boundary and the image-side exterior curved boundary comprises an inward facing mirror surface positioned proximate to and facing the outward facing mirror surface of the image-side curved CR boundary. In the alternative, or in addition to, the at least one exterior boundary may include an exterior planar reflection boundary with an inward facing mirror surface that faces the outward facing mirror surface of the object-side curved CR boundary and the outward facing mirror surface of the image-side curved CR boundary. In still another alternative, or in addition to, the at least one exterior boundary may include an object-side exterior planar reflection boundary, an image-side exterior planar reflection boundary and a centrally positioned planar reflection boundary. The object-side exterior planar reflection boundary comprises an inward facing mirror surface positioned proximate to and facing the outward facing mirror surface of the object-side curved CR boundary. The image-side exterior planar reflection boundary comprises an inward facing mirror surface positioned proximate to and facing the outward facing mirror surface of the image-side curved CR boundary. The centrally positioned planar reflection boundary comprises an outward facing mirror surface positioned between and facing the inward facing mirror surfaces of the object-side and image-side exterior planar reflection boundaries.

In one embodiment, a cloaking device assembly includes an object-side, an image-side, a pair of object-side curved cloaking region (CR) boundaries and a pair of image-side curved CR boundaries. Each of the pair of object-side curved CR boundaries comprise an outward facing mirror surface and an inward facing surface. Each of the pair of image-side curved CR boundaries comprise an outward facing mirror surface and an inward facing surface. A cloaked region is bounded by the inward facing surfaces of the pair of object-side curved CR boundaries and the pair of image-side curved CR boundaries. A cloaked object may be positioned within the cloaked region. At least one pair of exterior boundaries is included. Each of the at least one pair of exterior boundaries comprise an inward facing mirror surface spaced apart from one of the pair of object-side curved CR boundaries and one of the pair of image-side curved CR boundaries. Light from an object positioned on the object-side of the cloaking device assembly and obscured by the cloaked region is reflected by the pair of object-side curved CR boundaries, the at least one pair of exterior boundaries and the pair of image-side curved CR boundaries such that the light is redirected around the cloaked region to form an image of the object on the image-side of the cloaking device assembly such that the light from the object appears to pass through the cloaked region.

In another embodiment, a pillar assembly of a vehicle include an A-pillar and a cloaking device with an object-side and an image-side. The cloaking device includes an object-side curved cloaking region (CR) boundary having an outward facing mirror surface and an inward facing surface, and an image-side curved CR boundary an outward facing mirror surface and an inward facing surface. A cloaked region is bounded by the inward facing surfaces of the object-side curved CR boundary and the image-side curved CR boundary, and the A-pillar is positioned within the cloaked region. The cloaking device also includes at least one exterior boundary with an inward facing mirror surface spaced apart from the object-side curved CR boundary and the image-side curved CR boundary. Light from an object positioned on exterior to the vehicle and obscured by the A-pillar is redirected around the A-pillar to form an image of the object on the interior of the vehicle such that the light from the object appears to pass through the A-pillar. The at least exterior boundary may include an object-side exterior curved boundary and an image-side exterior curved boundary. The object-side exterior curved boundary comprises an inward facing mirror surface positioned proximate to and facing the outward facing mirror surface of the object-side curved CR boundary and the image-side exterior curved boundary comprises an inward facing mirror surface positioned proximate to and facing the outward facing mirror surface of the image-side curved CR boundary. In the alternative, or in addition to, the at least one exterior boundary may include an exterior planar reflection boundary with an inward facing mirror surface that faces the outward facing mirror surface of the object-side curved CR boundary and the outward facing mirror surface of the image-side curved CR boundary. In still another alternative, or in addition to, the at least one exterior boundary may include an object-side exterior planar reflection boundary, an image-side exterior planar reflection boundary and a centrally positioned planar reflection boundary. The object-side exterior planar reflection boundary comprises an inward facing mirror surface positioned proximate to and facing the outward facing mirror surface of the object-side curved CR boundary. The image-side exterior planar reflection boundary comprises an inward facing mirror surface positioned proximate to and facing the outward facing mirror surface of the image-side curved CR boundary. The centrally positioned planar reflection boundary comprises an outward facing mirror surface positioned between and facing the inward facing mirror surfaces of the object-side and image-side exterior planar reflection boundaries.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of curved mirrors or a plurality of curved mirrors and planar mirrors which direct incoming light around a cloaked region. The cloaking devices described herein may utilize concave mirrors, parabolic mirrors and planar mirrors to reflect, focus and defocus light from an object. Cloaking devices described herein may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the curved mirrors allows a driver to perceive an image which, if not for the cloaking device, would be obstructed by a pillar of the vehicle. Various embodiments of cloaking devices and methods for using the same will be described in further detail herein with specific reference to the appended drawings.

Figure 1:
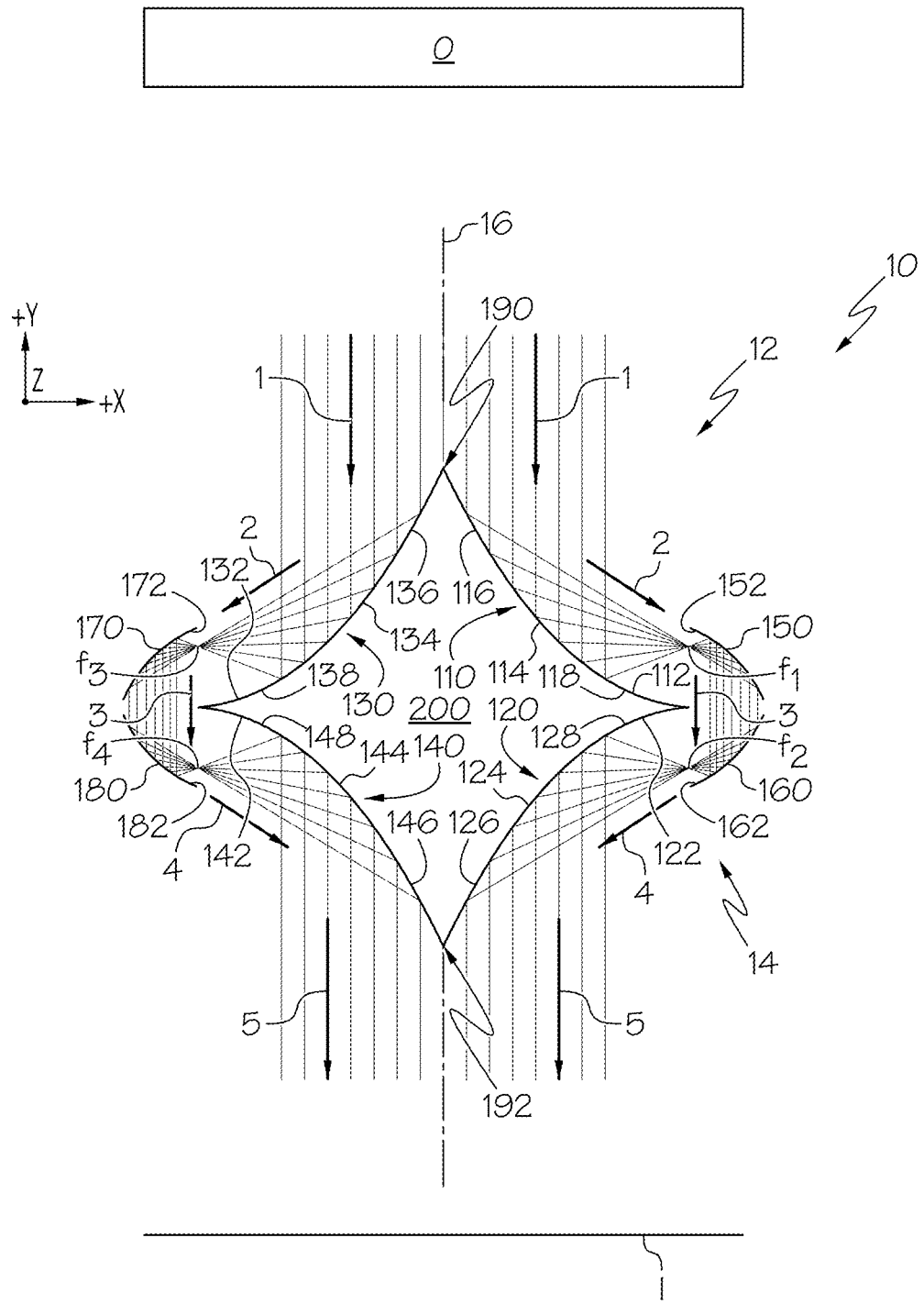
FIG. 1 schematically depicts a top view of a cloaking device according to one or more embodiments disclosed and described herein.

FIG. 1 generally depicts one embodiment of a cloaking device. The cloaking device includes a cloaking region (CR) that is at least partially bounded by at least two curved CR boundaries and at least two exterior curved reflection boundaries spaced apart from the at least two curved CR boundaries. As used herein, the terms "boundaries" and "boundary" refer to a physical surface and the term "exterior" refers to a boundary or mirror surface spaced apart from, i.e., positioned a predetermined distance from, one of the curved CR boundaries. One of the curved CR boundaries may be an object-side curved CR boundary and another of the curved CR boundaries may be an image-side curved CR boundary. One of the exterior curved reflection boundaries may be positioned proximate to the object-side curved CR boundary (referred to herein as an "object-side exterior curved reflection boundary") and another of the exterior curved reflection boundaries may be positioned proximate to the image-side curved CR boundary (referred to herein as an "image-side exterior curved reflection boundary"). The object-side curved CR boundary is oriented to reflect incident light from an object positioned on an object-side of the cloaking device onto the object-side curved CR reflection boundary. The object-side curved reflection boundary is oriented to reflect incident light reflected from the object-side curved CR boundary generally parallel onto the image-side exterior curved reflection boundary. The image-side exterior curved reflection boundary is oriented to reflect incident light reflected from the object-side exterior curved reflection boundary onto the image-side curved CR boundary. The image-side curved CR boundary is oriented to reflect incident light reflected from the image-side exterior curved reflection boundary and provide an image on the image side of the cloaking device.

Still referring to FIG. 1, embodiments of a cloaking device include a cloaking assembly 10 with an object-side 12, an image-side 14 and four curved CR boundaries 110, 120, 130, 140. Each of the four curved CR boundaries 110, 120, 130, 140 have a length along the X-axis, a width along the Y-axis and a height along the Z-axis shown in the figures. That is, the X-axis shown in the figures extends along a length of the four curved CR boundaries 110, 120, 130, 140, the Y-axis shown in the figures extends along a width of the four curved CR boundaries 110, 120, 130, 140, and the Z-axis shown in the figures extends along a height of the four curved CR boundaries 110, 120, 130, 140. The two curved CR boundaries 110, 130 may be positioned on the object-side 12 of the cloaking assembly 10 to face an object 'O' and may be referred to herein as object-side curved CR boundaries 110, 130. The two curved CR boundaries 120, 140 may be positioned on the image-side 14 of the cloaking assembly 10 to provide an image 'I' formed by the cloaking assembly 10 and may be referred to herein as image-side curved CR boundaries 120, 140.

The curved CR boundaries 110, 120, 130, 140 each have an outward facing mirror surface 112, 122, 132, 142 and an inward facing surface 114, 124, 134, 144, respectively. The term "outward" used herein refers to a surface that faces away and/or reflects light away from a cloaked region 200 and the term "inward" used herein refers to a surface that faces towards and/or reflects light towards the cloaked region 200. In embodiments, one or more of the inward facing surfaces 114, 124, 134, 144 may be an opaque surface, a mirror surface or a transparent surface. The outward facing mirror surfaces 112, 122, 132, 142 can be made from omnidirectional photonic crystals or mirrors such that light incident on the outward facing mirror surfaces 112, 122, 132, 142 is reflected there from. As used herein, the term "mirror surface" refers to a surface that reflects all modes of light (e.g. s-polarized light and p-polarized light) incident on the mirror surface. Also, as used herein the term "reflected there from" refers to at least 50% of incident light being reflected from a surface. In some embodiments, at least 60% of incident light is reflected from the surface, while in other embodiments at least 70% of incident light is reflected from the surface. In still other embodiments, at least 80% of incident light, for example at least 90% of incident light is reflected from the surface.

The curved CR boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the curved CR boundaries 110, 120, 130, 140 extend between apex ends 116, 126, 136, 146 and side ends 118, 128, 138, 148, respectively. In embodiments, the apex ends 116, 136 of the two object-side curved CR boundaries 110, 130, respectively, meet or intersect at an apex 190, and in the alternative or in addition to, the apex ends 126, 146 of the two image-side curved CR boundaries 120, 140, respectively, meet or intersect at an apex 192. In such embodiments, an apex axis 16 bisects the apex 190 and the apex 192 and may be a centerline of the cloaking assembly 10. In other embodiments, the apex ends 116, 136 of the two object-side curved CR boundaries 110, 130, respectively, are spaced apart from each other and the apex ends 126, 146 of the two image-side curved CR boundaries 120, 140, respectively, are spaced apart from each other such that a uncloaked region or gap (not shown) is present between the spaced apart apex ends 116, 136 and spaced apart apex ends 126, 146. In such embodiments, an image of the portion of the object O positioned above (+Y direction) the uncloaked region is not provided on the image side 14 of the cloaking assembly 10.

In embodiments, the side end 118 may be positioned adjacent to and may be joined to side end 128 and the side end 138 may be positioned adjacent to and may be joined to side end 148. In other embodiments, the side ends 118, 138 may be spaced apart (Y direction) from the side ends 128, 148 such that the cloaked region 200 is enlarged between the object O and image I (+/−Y direction).

In embodiments, the two object-side curved CR boundaries 110, 130 and two image-side curved CR boundaries 120, 140 form the cloaked region 200 that is bound at least partly by the inward facing surfaces 114, 134, 124, 144. The two object-side curved CR boundaries 110, 130 and two image-side curved CR boundaries 120, 140 have a height 'h' (FIGS. 4-5) in the Z-direction of the coordinate axes in the figures and light reflected or transmitted within the cloaked region 200 does not pass through the inward facing surfaces 114, 134, 124, 144. Accordingly, an article located within the cloaked region 200 (e.g., a cloaked article) is not visible to an observer viewing the cloaking assembly 10 from the image-side 14 in the +Y direction.

Still referring to FIG. 1, exterior curved reflection boundaries 150, 160, 170, 180 are spaced apart from and positioned proximate to the curved CR boundaries 110, 120, 130, 140, respectively. That is, the two exterior curved reflection boundaries 150, 170 positioned proximate the object-side curved CR boundaries 110, 130, respectively, are positioned on the object-side 12 of the cloaking assembly 10 and may be referred to herein as object-side exterior curved reflection boundaries 150, 170, and the two exterior curved reflection boundaries 160, 180 positioned proximate the image-side curved CR boundaries 120, 140, respectively, are positioned on the image-side 14 of the cloaking assembly 10 and may be referred to herein as image-side exterior curved reflection boundaries 160, 180. The object-side exterior curved reflection boundary 150 has an inward facing mirror surface 152 facing the outward facing mirror surface 112 of the object-side curved CR boundary 110 and the image-side exterior curved reflection boundary 160 has an inward facing mirror surface 162 facing the outward facing mirror surface 122 of the image-side curved CR boundary 120. The object-side exterior curved reflection boundary 170 has an inward facing mirror surface 172 facing the outward facing mirror surface 132 of the object-side curved CR boundary 130 and the image-side exterior curved reflection boundary 180 has an inward facing mirror surface 182 facing the outward facing mirror surface 142 of the image-side curved CR boundary 140. In embodiments, the exterior curved reflection boundaries 150, 160 are positioned to the side (+X direction) of the object-side curved CR boundary 110 and image-side curved CR boundary 120 such that light reflected from the inward facing mirror surface 152 to the inward facing mirror surface 162 is not obstructed by side ends 118, 128. The exterior curved reflection boundaries 170, 180 may also be positioned to the side (−X direction) of the object-side curved CR boundary 130 and image-side curved CR boundary 140 such that light reflected from the inward facing mirror surface 172 to the inward facing mirror surface 182 is not obstructed by side ends 138, 148.

The inward facing mirror surfaces 152, 162, 172, 182, can be made from omnidirectional photonic crystals or mirrors. Also, while FIG. 1 depicts object-side exterior curved reflection boundary 150 and image-side exterior curved reflection boundary 160 being two separate components, and object-side exterior curved reflection boundary 170 and image-side exterior curved reflection boundary 180 being two separate components, it should be understood that in embodiments the cloaking assembly 10 may be constructed as a single component (not shown) with the inward facing mirror surface 152 and the inward facing mirror surface 162 and/or a single component (not shown) with the inward facing mirror surface 172 and the inward facing mirror surface 182.

The object-side exterior curved reflection boundary 150 is positioned relative to the object-side curved CR boundary 110 such that light from the object O (shown as arrow '1' in FIG. 1) incident on cloaking assembly 10 on the right hand side (+X direction) of the apex axis 16 is incident on the outward facing mirror surface 112 and reflected onto the inward facing mirror surface 152 (shown as arrow '2' in FIG. 1). In embodiments, light 2 reflected from the outward facing mirror surface 112 is focused to a focal point $f_1$ located between and spaced apart from the outward facing mirror surface 112 and inward facing mirror surface 152. It should be understood that the focal point $f_1$, and other focal points descried herein, are provided by the curvature of a given mirror surface. For example, the focal point $f_1$ is due to or provided by the curvature of the outward facing mirror surface 112. Accordingly, reflected light 2 is focused to the focal point $f_1$ and then diverges before reaching and being incident on the inward facing mirror surface 152. Light 1 incident on the outward facing mirror surface 112 along the height h (Z-direction) of the object-side curved CR boundary 110 may be generally focused to a line intersecting the focal point $f_1$ and extending in the Z-direction before defocusing, reaching, and being incident on the inward facing mirror surface 152 along the height h of the object-side exterior curved reflection boundary 150.

The object-side exterior curved reflection boundary 170 is positioned relative to the object-side curved CR boundary 130 such that light 1 from the object O incident on cloaking assembly 10 on the left hand side (−X direction) of the apex axis 16 is incident on the outward facing mirror surface 132 and reflected as light 2 onto the inward facing mirror surface 172. In embodiments, light 2 reflected from the outward facing mirror surface 132 is focused by the curvature of the outward facing mirror surface 132 to a focal point $f_3$ located between and spaced apart from the outward facing mirror surface 132 and inward facing mirror surface 172. Accordingly, reflected light 2 is focused to the focal point $f_3$ and then diverges before reaching and being incident on the inward facing mirror surface 172. Light 1 incident on the outward facing mirror surface 132 along the height h (Z-direction) of the object-side curved CR boundary 130 may be generally focused to a line intersecting the focal point $f_3$ and extending in the Z-direction before defocusing, reaching, and being incident on the inward facing mirror surface 172 along the height h of the object-side exterior curved reflection boundary 170.

As noted above, the outward facing mirror surfaces 112, 132 may focus incident light 1 to the focal point $f_1$ and $f_3$ before diverging, reaching and being incident on the inward facing mirror surface 152, 172, respectively. For example and without limitation, the outward facing mirror surfaces 112, 132 may have a curved shape described by the expression:

$$y = \frac{x^2}{R\left(1 + \sqrt{1 - (1+K)\left(\frac{K^2}{R^2}\right)}\right)} \quad (1)$$

where R is the radius of curvature of the outward facing mirror surfaces 112, 132. In embodiments, the curved shape is parabolic, K=−1 and expression (1) reduces to:

$$y = \frac{x^2}{2R} = Ax^2 \quad (2)$$

where A=1/(2R) is a constant.

Still referring to FIG. 1, the inward facing mirror surface 152 of the object-side exterior curved reflection boundary 150 is positioned outward in the +X direction relative to the outward facing mirror surface 112 such that light 2 incident on the inward facing mirror surface 152 from the outward facing mirror surface 112 is reflected parallel to the −Y direction (shown as arrow '3' in FIG. 1) as light 3. In embodiments, the inward facing mirror surface 152 is a parabolic shaped mirror surface oriented generally 180° about the Z-axis relative to the outward facing mirror surface 112 and reflects light 2 parallel to light 1 (as light 3) to the inward facing mirror surface 162 of the image-side exterior curved reflection boundary 160. In embodiments, the curvature of the inward facing mirror surface 152 is the same as the curvature of the outward facing mirror surface 112. In other embodiments, the curvature of the inward facing mirror surface 152 is the same as the curvature of the outward facing mirror surface 112. In embodiments, the inward facing mirror surface 162 may be a parabolic shaped mirror surface oriented generally 90° about the Z-axis relative to the inward facing mirror surface 152 such that light 3 incident on the inward facing mirror surface 162 is reflected to the outward facing mirror surface 122. In embodiments, the curvature of the inward facing mirror surface 162 is the same as the curvature of the inward facing mirror surface 152. In other embodiments, the curvature of the inward facing mirror surface 162 is not the same as the curvature of the inward facing mirror surface 152.

The inward facing mirror surface 162 of the image-side exterior curved reflection boundary 160 is positioned in the +X direction relative to the outward facing mirror surface 122 such that light 3 reflected from the inward facing mirror surface 152 is reflected and focused (indicated by arrow '4' in FIG. 1) at focal point $f_2$ located between and spaced apart from the inward facing mirror surface 162 and outward facing mirror surface 122. Accordingly, the reflected light 4 is focused at the focal point $f_2$ by the curvature of the inward facing mirror surface 162 and then diverges before reaching and being incident on the outward facing mirror surface 122. In embodiments, the curvature of the inward facing mirror surface 162 is the same as the curvature of the outward facing mirror surface 122. In other embodiments, the curvature of the inward facing mirror surface 162 is the same as the curvature of the outward facing mirror surface 122. It should be understood that light 3 incident on the inward facing mirror surface 162 along the height h (Z-direction) of the image-side exterior curved reflection boundary 160 may be reflected and generally focused to a line intersecting the focal point $f_2$ and extending in the Z-direction before defocusing and reaching the outward facing mirror surface 122 along the height h of the image-side curved CR boundary 120. In embodiments, the outward facing mirror surface 122 is a parabolic shaped mirror surface oriented generally 180° about the Z-axis relative to the inward facing mirror surface 162 such incident light 4 is reflected back to its original path (indicated by arrow '5' in FIG. 1), i.e., reflected parallel to light 1.

Similar to the inward facing mirror surface 152, the inward facing mirror surface 172 of the object-side exterior curved reflection boundary 170 is positioned outward in the −X direction relative to the outward facing mirror surface 132 such that light 2 incident on the inward facing mirror surface 172 from the outward facing mirror surface 132 is reflected parallel as light 3 in the −Y direction. In embodiments, the inward facing mirror surface 172 is a parabolic shaped mirror surface oriented generally 180° about the Z-axis relative to the outward facing mirror surface 132 and reflects light 2 parallel to light 1 (as light 3) to the inward facing surface 182 of the image-side exterior curved reflection boundary 180. In embodiments, the curvature of the inward facing mirror surface 172 is the same as the curvature of the outward facing mirror surface 132. In other embodiments, the curvature of the inward facing mirror surface 172 is the same as the curvature of the outward facing mirror surface 132. The inward facing mirror surface 182 may be a parabolic shaped mirror surface oriented generally 90° about the Z-axis relative to the inward facing mirror surface 172 such that light 3 incident on the inward facing mirror surface 182 is reflected to the outward facing mirror surface 142. The curvature of the inward facing mirror surface 182 may be the same or different from the curvature of the inward facing mirror surface 172.

The inward facing mirror surface 182 of the image-side exterior curved reflection boundary 180 is positioned outward in the −X direction relative to the outward facing mirror surface 142 such that light 3 reflected from the inward facing mirror surface 172 is reflected as light 4 and focused at focal point $f_4$ located between and spaced apart from the inward facing mirror surface 182 and outward facing mirror surface 142. Accordingly, reflected light 4 is focused at the focal point $f_4$ and then diverges before reaching and being incident on the outward facing mirror surface 142. In embodiments, the curvature of the inward facing mirror surface 182 is the same as the curvature of the outward facing mirror surface 142. In other embodiments, the curvature of the inward facing mirror surface 182 is the same as the curvature of the outward facing mirror surface 142. It should be understood that light 3 incident on the inward facing mirror surface 182 along the height h (Z-direction) of the image-side exterior curved reflection boundary 180 may be reflected and generally focused to a line intersecting the focal point $f_4$ and extending in the Z-direction before defocusing and reaching the outward facing mirror surface 142 along the height h of the image-side curved CR boundary 140. In embodiments, the outward facing mirror surface 142 is a parabolic shaped mirror surface oriented generally 180° about the Z-axis relative to the inward facing mirror surface 182 such incident light 4 is reflected back to its original path (light 5).

Still referring to FIG. 1, light 1 from the object 'O' travels in the −Y direction and is incident on the outward facing mirror surfaces 112, 132. Light 1 on the right hand side (+X-direction) of the apex axis 16 of the cloaking assembly 10 is reflected and focused by the outward facing mirror surface 112 as light 2 to the focal point $f_1$ before defocusing, reaching and being incident on the inward facing mirror surface 152. Light 2 incident on the inward facing mirror surface 152 is reflected generally parallel to light 1 by the inward facing mirror surface 152 as light 3 onto the inward facing mirror surface 162. Light 3 is reflected and focused by the inward facing mirror surface 162 as light 4 to the focal point $f_2$ before defocusing, reaching and being incident on the outward facing mirror surface 122. Light 4 incident on the outward facing mirror surface 122 is reflected generally parallel to light 1 in the −Y-direction by the outward facing mirror surface 122 (indicated by arrow '5' in FIG. 1) and forms a portion of the image I corresponding to the portion of the object O positioned to the right (+X-direction) of the apex axis 16. Accordingly, light 1 from the object O on the right hand side of the apex axis 16 has an optical path of: O—outward facing mirror surface 112—inward facing mirror surface 152—inward facing mirror surface 162—outward facing mirror surface 122—I.

Light 1 on the left hand side (−X-direction) of the apex axis 16 of the cloaking assembly 10 is reflected and focused by the outward facing mirror surface 132 as light 2 to the focal point $f_3$ before defocusing, reaching and being incident on the inward facing mirror surface 172. Light 2 incident on the inward facing mirror surface 172 is reflected generally parallel by the inward facing mirror surface 172 as light 3 onto the inward facing mirror surface 182. Light 3 is reflected and focused by the inward facing mirror surface 182 as light 4 to the focal point $f_4$ before defocusing, reaching and being incident on the outward facing mirror surface 142. Light 4 incident on the outward facing mirror surface 142 is reflected as light 5 generally parallel to light 1 in the −Y-direction by the outward facing mirror surface 142 and forms a portion of the image I corresponding to the portion of the object O positioned to the left (−X-direction) of the apex axis 16. Accordingly, light 1 from the object O on the left hand side of the apex axis 16 has an optical path of O—outward facing mirror surface 132—inward facing mirror surface 172—inward facing mirror surface 182—outward facing mirror surface 142—I.

Figure 2:
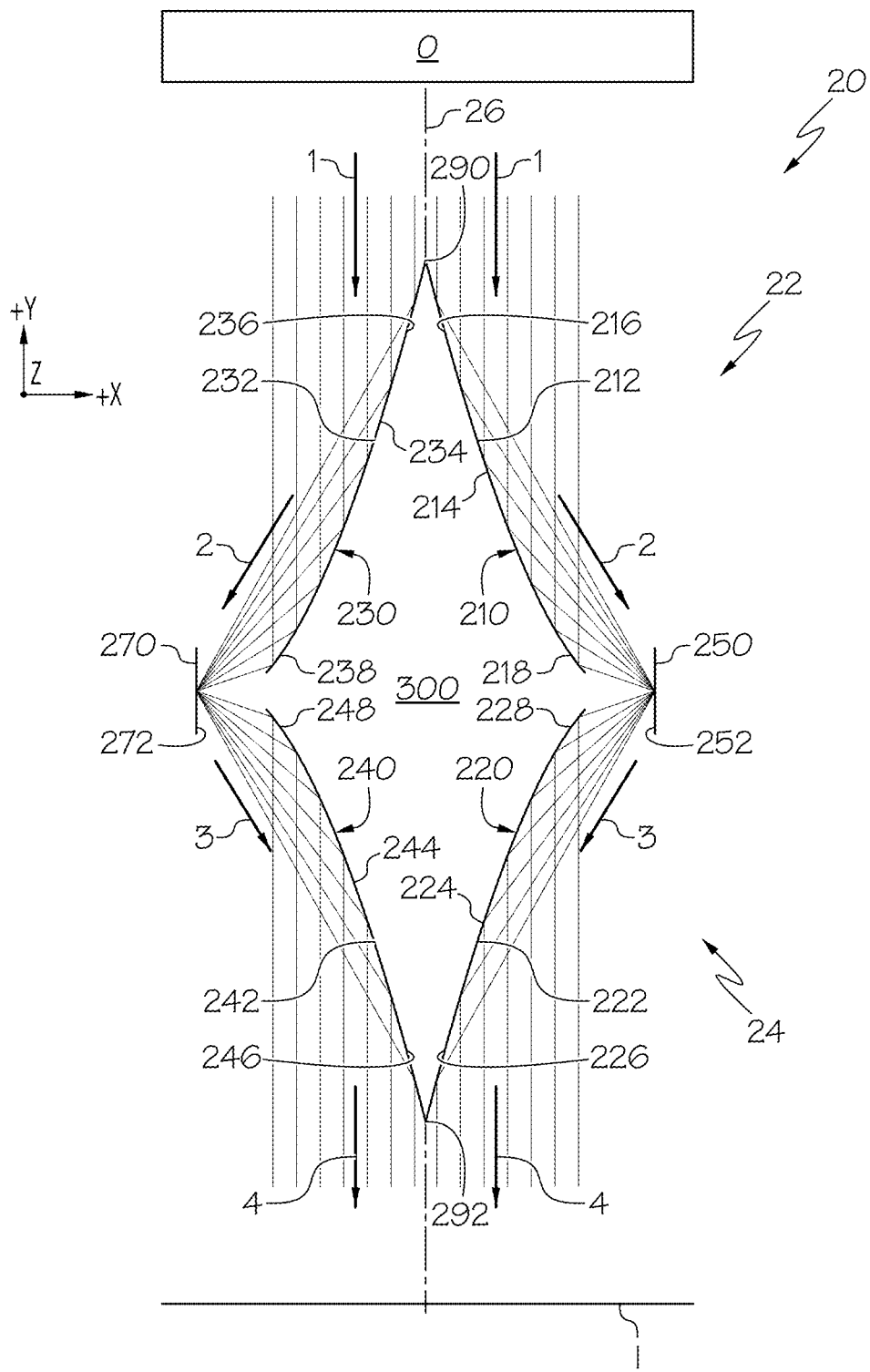
FIG. 2 schematically depicts a top view of a cloaking device according to one or more embodiments disclosed and described herein.

Referring to FIG. 2, another embodiment of a cloaking device includes a cloaking region (CR) that is at least partially bounded by at least two curved CR boundaries and includes at least one planar reflection boundary spaced apart from the at least two curved CR boundaries. One of the curved CR boundaries may be an object-side curved CR boundary and another of the curved CR boundaries may be an image-side curved CR boundary. A planar reflection boundary may be spaced apart and positioned generally between the object-side curved CR boundary and the image-side curved CR boundary. The object-side curved CR boundary is oriented to reflect incident light from an object positioned on an object-side of the cloaking device onto the planar reflection boundary, which in turn is oriented to reflect incident light reflected from the planar reflection boundary onto the image-side curved CR boundary. The image-side curved CR boundary is oriented to reflect incident light reflected from the planar reflection boundary and provides an image on the image side of the cloaking device.

Still referring to FIG. 2, embodiments of a cloaking device include a cloaking assembly 20 with an object-side 22, an image-side 24 and four curved CR boundaries 210, 220, 230, 240. Each of the four curved CR boundaries 210, 220, 230, 240 have a length along the X-axis, a width along the Y-axis and a height along the Z-axis shown in the figures. That is, the X-axis shown in the figures extends along a length of the four curved CR boundaries 210, 220, 230, 240, the Y-axis shown in the figures extends along a width of the four curved CR boundaries 210, 220, 230, 240, and the Z-axis shown in the figures extends along a height of the four curved CR boundaries 210, 220, 230, 240. The two curved CR boundaries 210, 230 may be positioned on the object-side 22 of the cloaking assembly 20 to face an object 'O' and may be referred to herein as object-side curved CR boundaries 210, 230. The two curved CR boundaries 220, 240 may be positioned on the image-side 24 of the cloaking assembly 20 to provide an image 'I' formed by the cloaking assembly 20 and may be referred to herein as image-side curved CR boundaries 220, 240.

The curved CR boundaries 210, 220, 230, 240 each have an outward facing mirror surface 212, 222, 232, 242 and an inward facing surface 214, 224, 234, 244, respectively. In embodiments, one or more of the inward facing surfaces 214, 224, 234, 244 may be an opaque surface, a mirror surface or a transparent surface. The outward facing mirror surfaces 212, 222, 232, 242 can be made from omnidirectional photonic crystals or mirrors.

The curved CR boundaries 210, 220, 230, 240 may have an apex end 216, 226, 236, 246 and a side end 218, 228, 238, 248, respectively. The side ends 218, 228, 238, 248 are spaced apart from the apex ends 216, 226, 236, 246, respectively, and the curved CR boundaries 210, 220, 230, 240 extend between apex ends 216, 226, 236, 246 and side ends 218, 228, 238, 248, respectively. In embodiments, the apex ends 216, 236 of the two object-side curved CR boundaries 210, 230, respectively, meet or intersect at an apex 290, and in the alternative or in addition to, the apex ends 226, 246 of the two image-side curved CR boundaries 220, 240, respectively, meet or intersect at an apex 292. In such embodiments, an apex axis 26 bisects the apex 290 and the apex 292 and may be a centerline of the cloaking assembly 20. In other embodiments, the apex ends 216, 236 of the two object-side curved CR boundaries 210, 230, respectively, are spaced apart from each other and the apex ends 226, 246 of the two image-side curved CR boundaries 220, 240, respectively, are spaced apart from each other such that an uncloaked region or gap (not shown) is present between the spaced apart apex ends 216, 236 and spaced apart apex ends 226, 246. In such embodiments, an image of the portion of the object O positioned above (+Y direction) the uncloaked region is not provided on the image side 24 of the cloaking assembly 20.

In embodiments, the side end 218 may be positioned adjacent to and may be joined to side end 228 and the side end 238 may be positioned adjacent to and may be joined to side end 248. In other embodiments, the side ends 218, 238 may be spaced apart (Y direction) from the side ends 228, 248 such that the cloaked region 300 is enlarged between the object O and image I (Y direction).

In embodiments, the two object-side curved CR boundaries 210, 230 and two image-side curved CR boundaries 220, 240 form the cloaked region 300 that is bound at least partly by the inward facing surfaces 214, 234, 224, 244. The two object-side curved CR boundaries 210, 230 and two image-side curved CR boundaries 220, 240 have a height 'h' (FIGS. 4-5) in the Z-direction of the coordinate axes in the figures and light reflected or transmitted within the cloaked region 300 does not pass through the inward facing surfaces 214, 234, 224, 244. Accordingly, an article located within the cloaked region 300 (e.g., a cloaked article) is not visible to an observer viewing the cloaking assembly 20 from the image-side 24 in the +Y direction.

Still referring to FIG. 2, exterior planar reflection boundaries 250, 270 are spaced apart from and positioned proximate to the side ends 218, 228 and 238, 248, respectively, of the curved CR boundaries 210, 220 and 230, 240, respectively. The exterior planar reflection boundary 250 has an inward facing mirror surface 252 facing the cloaked region 300 and the planar reflection boundary 270 has an inward facing mirror surface 272 facing the cloaked region 300. In embodiments, the exterior planar reflection boundary 250 is positioned to the side (+X direction) of the curved CR boundaries 210, 220 and the exterior planar reflection boundary 270 is positioned to the side (−X direction) of the curved CR boundaries 230, 240. The exterior planar reflection boundary 250 may be centrally positioned relative to the curved CR boundaries 210, 220 and the planar reflection boundary 270 may be centrally positioned relative to the curved CR boundaries 230, 240 as depicted in FIG. 2. Also, the inward facing mirror surfaces 252, 272 may be oriented or aligned generally parallel to the apex axis 26 that bisects the apex 290 and the apex 292.

The inward facing mirror surfaces 252 and 272 can be made from omnidirectional photonic crystals or mirrors such that approximately 100% (+/−10%) of light incident on the outward facing mirror surfaces is reflected from the outward facing mirror surfaces.

The exterior planar reflection boundary 250 may be centrally positioned relative to curved CR boundaries 210, 220 such that light 1 from the object O incident on the outward facing mirror surface 212 is reflected as light 2 onto the inward facing mirror surface 252. In embodiments, light 2 reflected from the outward facing mirror surface 212 is focused onto the inward facing mirror surface 252. In such embodiments, light 2 may be focused to a line on and along the height (Z-direction) of the inward facing mirror surface 252 that is centrally positioned relative to the curved CR boundaries 210, 220. The light 2 is reflected and defocused by the inward facing mirror surface 252 as light 3 before reaching and being incident on outward facing mirror surface 222. Light 3 is reflected by the outward facing mirror surface 222 back to its original path as light 4.

The exterior planar reflection boundary 270 may be centrally positioned relative to curved CR boundaries 230, 240 such that light 1 from the object O incident on the outward facing mirror surface 232 is reflected as light 2 onto the inward facing mirror surface 272. In embodiments, light 2 reflected from the outward facing mirror surface 232 is focused onto the inward facing mirror surface 272. In such embodiments, light 2 may be focused to a line on and along the height (Z-direction) of the inward facing mirror surface 272 that is centrally positioned relative to the curved CR boundaries 230, 240. The light 2 is reflected and defocused by the inward facing mirror surface 272 as light 3 before reaching and being incident on outward facing mirror surface 242. Light 3 is reflected by the outward facing mirror surface 222 as light 4 back to its original path.

Light 1 incident on the cloaking assembly 20 on the right hand side (+X direction) of the apex axis 26 is incident on, reflected and focused as light 2 by the outward facing mirror surface 212 onto the inward facing mirror surface 252, reflected and defocused as light 3 by the inward facing mirror surface 252 onto the outward facing mirror surface 222, and then reflected by the outward facing mirror surface 222 as light 4 back to its original path. Accordingly, light 1 from the object O on the right hand side of the apex axis 26 has an optical path of: O—outward facing mirror surface 212—inward facing mirror surface 252—outward facing mirror surface 222—I.

Light 1 incident on the cloaking assembly 20 on the left hand side (−X direction) of the apex axis 26 is incident on, reflected and focused by the outward facing mirror surface 232 as light 2 onto the inward facing mirror surface 272, reflected and defocused by the inward facing mirror surface 272 as light 3 onto the outward facing mirror surface 242, and then reflected by the outward facing mirror surface 242 as light 4 back to its original path. Accordingly, light 1 from the object O on the left hand side of the apex axis 26 has an optical path of O—outward facing mirror surface 232—inward facing mirror surface 272—outward facing mirror surface 242—I.

Figure 3:
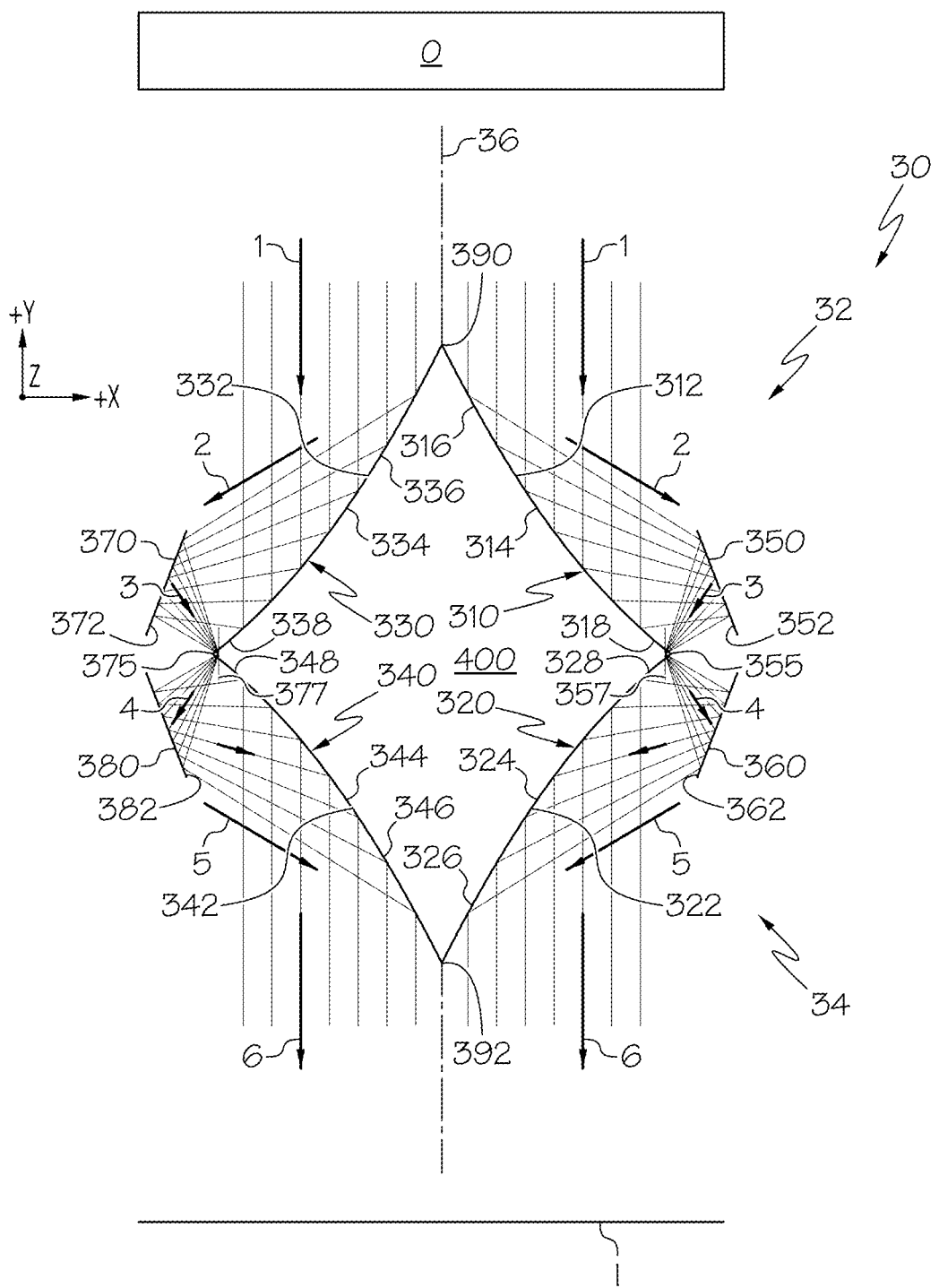
FIG. 3 schematically depicts a top view of a cloaking device according to one or more embodiments disclosed and described herein.

Referring to FIG. 3, another embodiment of a cloaking device includes a cloaking region (CR) that is at least partially bounded by at least two curved CR boundaries and includes at least three planar reflection boundaries. Two of the planar reflection boundaries are spaced apart from the at least two curved CR boundaries (referred to herein as "exterior planar reflection boundaries") and have inward facing mirror surfaces, and one of the planar reflection boundaries is centrally positioned between the exterior planar reflection boundaries (referred to herein as a "centrally positioned planar reflection boundary") and has an outward facing mirror surface. One of the curved CR boundaries may be an object-side curved CR boundary and another of the curved CR boundaries may be an image-side curved CR boundary. One of the exterior planar reflection boundaries may be an object-side exterior planar reflection boundary and another of the exterior planar reflection boundaries may be an image-side exterior planar reflection boundary. The object-side curved CR boundary is oriented to reflect incident light from an object positioned on an object-side of the cloaking device onto the object-side exterior planar reflection boundary, which in turn is oriented to reflect the light to the centrally positioned planar reflection boundary. The centrally positioned planar reflection boundary is oriented to reflect the light to the image-side exterior planar reflection boundary, which in turn is oriented to reflect the light onto the image-side curved CR boundary. The image-side curved CR boundary is oriented to reflect the light and provide an image on the image side of the cloaking device.

Still referring to FIG. 3, embodiments of a cloaking device include a cloaking assembly 30 with an object-side 32, an image-side 34 and four curved CR boundaries 310, 320, 330, 340. Each of the four curved CR boundaries 310, 320, 330, 340 have a length along the X-axis, a width along the Y-axis and a height along the Z-axis shown in the figures. That is, the X-axis shown in the figures extends along a length of the four curved CR boundaries 310, 320, 330, 340, the Y-axis shown in the figures extends along a width of the four curved CR boundaries 310, 320, 330, 340, and the Z-axis shown in the figures extends along a height of the four curved CR boundaries 310, 320, 330, 340. The two curved CR boundaries 310, 330 may be positioned on the object-side 32 of the cloaking assembly 30 to face an object 'O' and may be referred to herein as object-side curved CR boundaries 310, 330. The two curved CR boundaries 320, 340 may be positioned on the image-side 34 of the cloaking assembly 30 to provide an image 'I' formed by the cloaking assembly 30 and may be referred to herein as image-side curved CR boundaries 320, 340.

The curved CR boundaries 310, 320, 330, 340 each have an outward facing mirror surface 312, 322, 332, 342 and an inward facing surface 314, 324, 334, 344, respectively. In embodiments, one or more of the inward facing surfaces 314, 324, 334, 344 may be an opaque surface, a mirror surface or a transparent surface. The outward facing mirror surfaces 312, 322, 332, 342 can be made from omnidirectional photonic crystals or mirrors.

The curved CR boundaries 310, 320, 330, 340 may have an apex end 316, 326, 336, 346 and a side end 318, 328, 338, 348, respectively. The side ends 318, 328, 338, 348 are spaced apart from the apex ends 316, 326, 336, 346, respectively, and the curved CR boundaries 310, 320, 330, 340 extend between apex ends 316, 326, 336, 346 and side ends 318, 328, 338, 348, respectively. In embodiments, the apex ends 316, 336 of the two object-side curved CR boundaries 310, 330, respectively, meet or intersect at an apex 390, and in the alternative or in addition to, the apex ends 326, 346 of the two image-side curved CR boundaries 320, 340, respectively, meet or intersect at an apex 392. In such embodiments, an apex axis 36 bisects the apex 390 and the apex 392 and may be a centerline of the cloaking assembly 30. In other embodiments, the apex ends 316, 336 of the two object-side curved CR boundaries 310, 330, respectively, are spaced apart from each other and the apex ends 326, 346 of the two image-side curved CR boundaries 320, 340, respectively, are spaced apart from each other such that an uncloaked region or gap (not shown) is present between the spaced apart apex ends 316, 336 and spaced apart apex ends 326, 346. In such embodiments, an image of the portion of the object O positioned above (+Y direction) the uncloaked region is not provided on the image side 34 of the cloaking assembly 30.

In embodiments, the side end 318 may be positioned adjacent to and may be joined to side end 328 and the side end 338 may be positioned adjacent to and may be joined to side end 348. In other embodiments, the side ends 318, 338 may be spaced apart (Y direction) from the side ends 328, 348 such that the cloaked region 300 is enlarged between the object O and image I (+/−Y direction).

In embodiments, the two object-side curved CR boundaries 310, 330 and two image-side curved CR boundaries 320, 340 form the cloaked region 400 that is bound at least partly by the inward facing surfaces 314, 334, 324, 344. The two object-side curved CR boundaries 310, 330 and two image-side curved CR boundaries 320, 340 have a height 'h' (FIGS. 4-5) in the Z-direction of the coordinate axes in the figures and light reflected or transmitted within the cloaked region 400 does not pass through the inward facing surfaces 314, 334, 324, 344. Accordingly, an article (e.g., a cloaked article) located within the cloaked region 400 is not visible to an observer viewing the cloaking assembly 30 from the image-side 34 in the +Y direction.

Still referring to FIG. 3, exterior planar reflection boundaries 350, 360 are spaced apart from and positioned proximate to the side ends 318, 328, respectively, of the curved CR boundaries 310, 320, respectively. Exterior planar reflection boundaries 370, 380 are spaced apart from and positioned proximate to the side ends 338, 348, respectively, of the curved CR boundaries 330, 340, respectively. The exterior planar reflection boundary 350 is positioned on the object-side 32 of the cloaking assembly 30 (hereafter also referred to as the "object-side exterior planar reflection boundary 350") and has an inward facing mirror surface 352 facing the cloaked region 400. The exterior planar reflection boundary 360 is positioned on the image-side 34 of the cloaking assembly 30 (hereafter also referred to as the "image-side exterior planar reflection boundary 360") and has an inward facing mirror surface 362 facing the cloaked region 400. Similarly, the exterior planar reflection boundary 370 is positioned on the object-side 32 of the cloaking assembly 30 (object-side exterior planar reflection boundary 370) and has an inward facing mirror surface 372 facing the cloaked region 400. The exterior planar reflection boundary 380 is positioned on the image-side 34 of the cloaking assembly 30 (image-side exterior planar reflection boundary 380) and has an inward facing mirror surface 382 facing the cloaked region 400. Positioned between the object-side exterior planar reflection boundary 350 and image-side exterior planar reflection boundary 360 is a centrally positioned planar reflection boundary 355 with an outward facing mirror surface 357. Positioned between the object-side exterior planar reflection boundary 370 and image-side exterior reflection boundary 380 is a centrally positioned planar reflection boundary 375 with an outward facing mirror surface 377.

In embodiments, the exterior planar reflection boundaries 350, 360 are positioned to the side (+X direction) of the curved CR boundaries 310, 320 and the exterior planar reflection boundaries 370, 380 are positioned to the side (−X direction) of the curved CR boundaries 330, 340. The centrally positioned planar reflection boundaries 355, 375 may be positioned adjacent to the side ends 318, 328 and side ends 338, 348, respectively. Also, the outward facing mirror surfaces 357, 377 of the centrally positioned planar reflection boundaries 355, 375 may be oriented generally parallel to the apex axis 36 that bisects the apex 390 and the apex 392. In the alternative or in addition to, the outward facing mirror surfaces 357, 377 of the centrally positioned planar reflection boundaries 355, 375 may be oriented generally parallel to light 1.

The inward facing mirror surfaces 352, 362, 372, 382, and the outward facing mirror surfaces 357 and 377 can be made from omnidirectional photonic crystals or mirrors. Also, while FIG. 3 depicts object-side exterior planar reflection boundary 350 and image-side exterior planar reflection boundary 360 being two separate components, and object-side exterior planar reflection boundary 370 and image-side exterior planar reflection boundary 380 being two separate components, it should be understood that in embodiments the cloaking assembly 30 may be constructed as a single component (not shown) with the inward facing mirror surface 352 and the inward facing mirror surface 362 and/or a single component (not shown) with the inward facing mirror surface 372 and the inward facing mirror surface 382.

The exterior planar reflection boundaries 350, 360 and the centrally positioned planar reflection boundary 355 may be positioned relative to curved CR boundaries 310, 320 such that light 1 from the object O incident on the outward facing mirror surface 312 is reflected onto the inward facing mirror surface 352 as light 2. In embodiments, light 2 reflected from the outward facing mirror surface 312 is focused onto the inward facing mirror surface 352 and the inward facing mirror surface 352 reflects the light (which is further focused) onto outward facing mirror surface 357 as light 3. In such embodiments, light 3 may be focused to a line on and along the height (Z-direction) of the outward facing mirror surface 357 that is centrally positioned relative to the curved CR boundaries 310, 320. The light 3 is reflected by the outward facing mirror surface 357 and diverges as light 4 before reaching and being incident on inward facing mirror surface 362. Light 4 is reflected by the inward facing mirror surface 362 and further diverges as light 5 before reaching the outward facing mirror surface 322. Light 5 is reflected by the outward facing mirror surface 322 as light 6 back to its original path to form a portion of the image 'I' on the image-side 34 of the cloaking assembly 30.

The exterior planar reflection boundaries 370, 380 and the centrally positioned planar reflection boundary 375 may be positioned relative to curved CR boundaries 330, 340 such that light 1 from the object O incident on the outward facing mirror surface 332 is reflected as light 2 onto the inward facing mirror surface 372. In embodiments, light 2 reflected from the outward facing mirror surface 332 is focused onto the inward facing mirror surface 372 and the inward facing mirror surface 372 reflects the light (which is further focused) onto outward facing mirror surface 377 as light 3. In such embodiments, light 3 may be focused to a line on and along the height (Z-direction) of the outward facing mirror surface 377 that is centrally positioned relative to the curved CR boundaries 330, 340. Light 3 is reflected by the outward facing mirror surface 377 and diverges as light 4 before reaching and being incident on inward facing mirror surface 382. Light 4 is reflected by the inward facing mirror surface 382 and further diverges as light 5 before reaching the outward facing mirror surface 342. Light 5 is reflected by the outward facing mirror surface 342 as light 6 back to its original path as light 6 to form a portion of the image 'I' on the image-side 34 of the cloaking assembly 30.

Light 1 incident on the cloaking assembly 30 on the right hand side (+X direction) of the apex axis 36 is incident on, reflected and focused by the outward facing mirror surface 312 (light 2) onto the inward facing mirror surface 352, reflected and further focused by the inward facing mirror surface 352 onto the outward facing mirror surface 357 (light 3). The outward facing mirror surface 357 reflects incident light 3 which diverges as light 4 onto the inward facing mirror surface 362. The inward facing mirror surface 362 reflects light 4 which further diverges as light 5 onto the outward facing mirror surface 322. The outward facing mirror surface 322 reflects light 5 back to its original path (light 6). Accordingly, light 1 from the object O on the right hand side of the apex axis 36 has an optical path of: O—outward facing mirror surface 312—inward facing mirror surface 352—outward facing mirror surface 357—inward facing mirror surface 362—outward facing mirror surface 322—I.

Light 1 incident on the cloaking assembly 30 on the left hand side (−X direction) of the apex axis 36 is incident on, reflected and focused by the outward facing mirror surface 332 (light 2) onto the inward facing mirror surface 372, reflected and further focused by the inward facing mirror surface 372 onto the outward facing mirror surface 377 (light 3). The outward facing mirror surface 377 reflects the incident light 3 which diverges as light 4 onto the inward facing mirror surface 382. The inward facing mirror surface 382 reflects the incident light 4 which diverges as light 5 onto the outward facing mirror surface 342 (light 5). The outward facing mirror surface 342 reflects light 5 back to its original path (light 6). Accordingly, light 1 from the object O on the left hand side of the apex axis 36 has an optical path of O—outward facing mirror surface 332—inward facing mirror surface 372—outward facing mirror surface 377—inward facing mirror surface 382—outward facing mirror surface 342—I.

Figure 4:
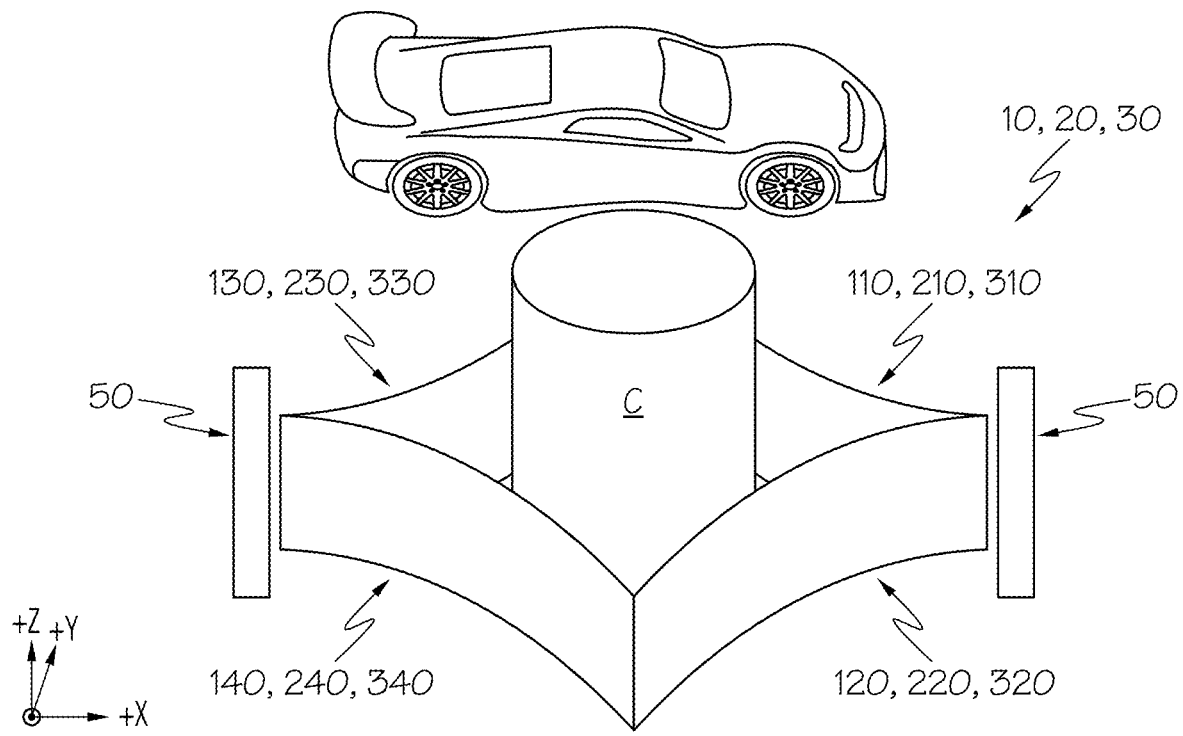
FIG. 4 schematically depicts a top perspective view of the cloaking devices of FIGS. 1-3 with a first object on one side of the cloaking devices and a second object within the cloaking regions of the cloaking devices according to one or more embodiments disclosed and described herein.
Figure 5:
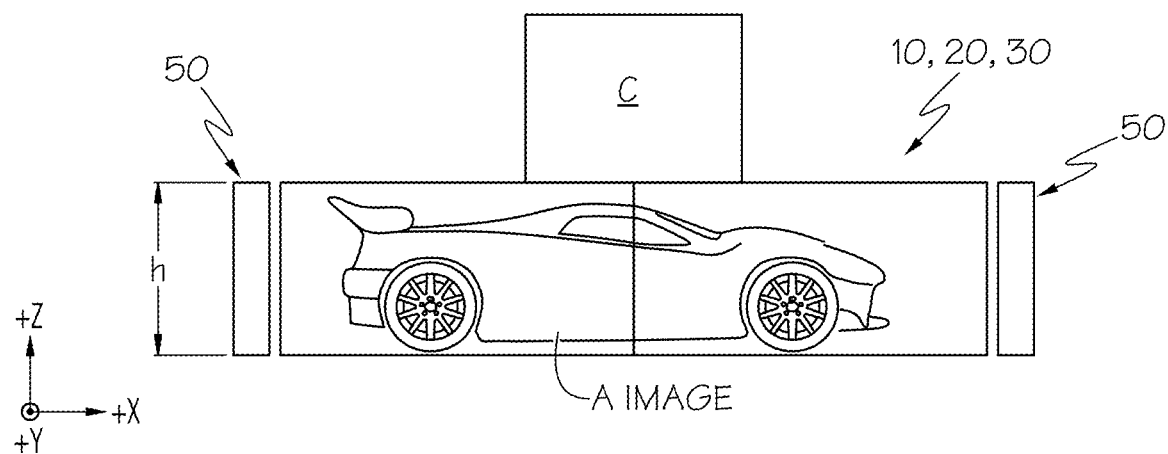
FIG. 5 schematically depicts a side view of the cloaking devices of FIGS. 1-3 with the first object on one side of the cloaking devices and the second object within the cloaking regions of the cloaking devices.

Referring now to FIGS. 1-5, a top perspective view and a side view of cloaking devices according to embodiments as discussed with respect to FIGS. 1-3 are shown in FIGS. 4 and 5, respectively. Specifically, FIG. 4 is a top perspective view of an article in the form of a column 'C' within the cloaked regions of the cloaking assemblies 10, 20, 30 and an automobile 'A' located behind the column C on the object-side 12, 22, 32 of the cloaking assemblies 10, 20, 30 in the +Y direction. The column C has a height dimension in the Z direction (increasing height in the +Z direction) greater than the height h of the cloaking device. The boxes labeled '50' depicts the various optical components excluding the curved CR boundaries. Particularly, boxes 50 depict: the object-side exterior curved reflection boundaries 150, 170 and image-side exterior curved reflection boundaries 160, 180 of cloaking assembly 10 as depicted in FIG. 1; the exterior planar reflection boundaries 250, 270 of cloaking assembly 20 as depicted in FIG. 2; and the object-side exterior planar reflection boundaries 350, 370, centrally positioned planar reflection boundaries 355, 375 and image-side exterior planar reflection boundaries 360, 380 as depicted in FIG. 3. FIG. 5 is a side view from the +Y direction of the cloaking assemblies 10, 20, 30 shown in FIGS. 1-3 and shows the portion of the column C that is within the cloaked region is not visible and the automobile A located behind the column C in the +Y direction is visible to an observer viewing the cloaking assemblies 10, 20, 30 in the +Y direction. Accordingly, the column C positioned within the cloaked region is not visible to an observer viewing the image-side 14, 24, 34 of the cloaking assemblies 10, 20, 30 and an image of the entire automobile A is visible to the observer viewing the image-side 14, 24, 34. Although column C in FIGS. 4 and 5 is separate from the curved CR boundaries (e.g., curved CR boundaries 110, 120, 130, 140 of cloaking assembly 10), i.e., column C is a separate object from the cloaking assemblies 10, 20, 30, it should be appreciated that column C may be structurally part of cloaking assemblies 10, 20, 30 and have an outer surface that provides or is equivalent to the curved CR boundaries with outward facing mirror surfaces.

Figure 6:
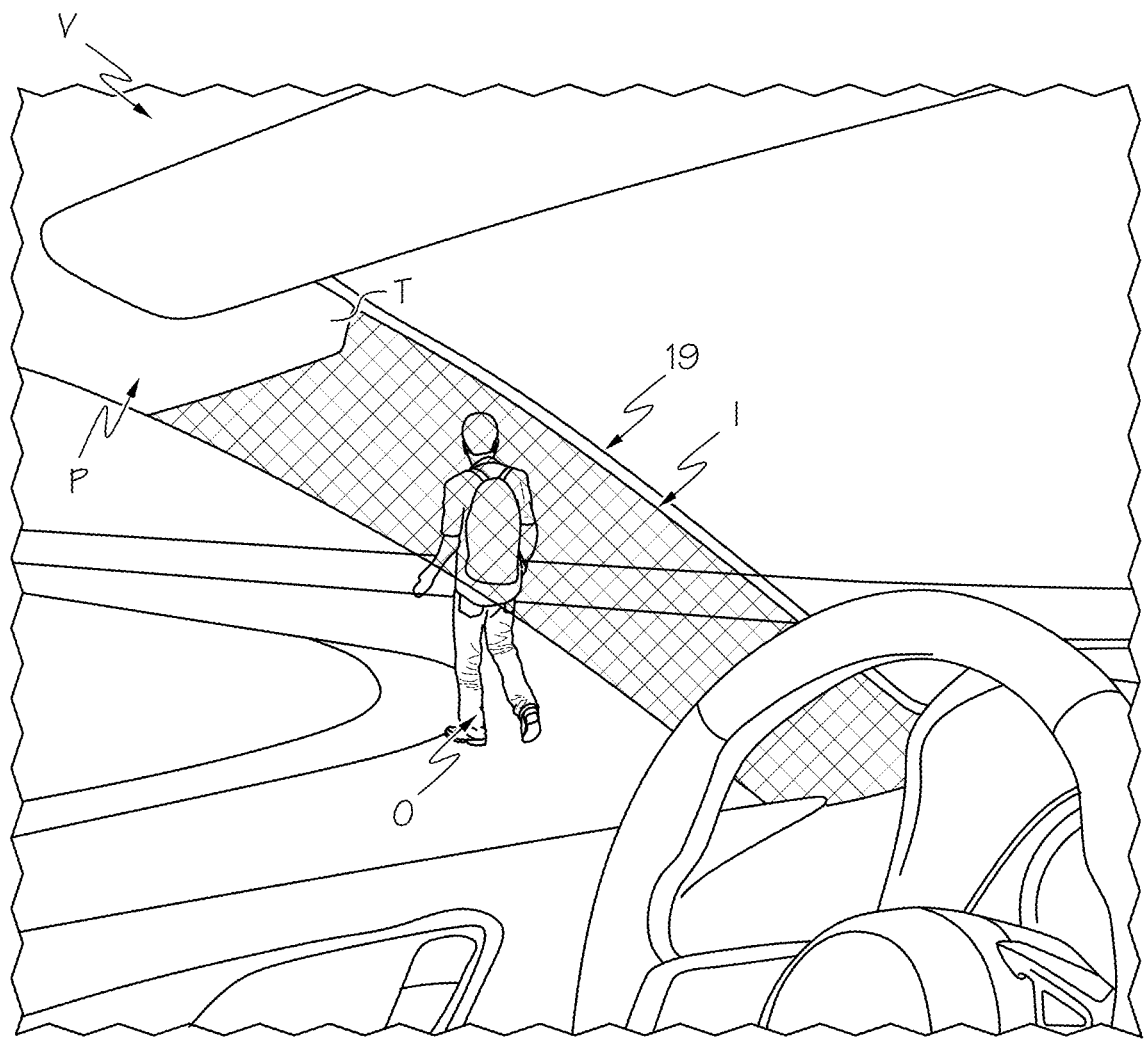
FIG. 6 schematically depicts a cloaking device cloaking a vehicle A-pillar of a vehicle according to one or more embodiments described and illustrated herein.

Referring to FIG. 6, embodiments of an A-pillar of a vehicle being cloaked by a cloaking device are shown. Particularly, FIG. 6 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. In embodiments, the A-pillar P itself serves as the CR, i.e. the A-pillar P has an outer surface with one or more outer facing mirror surfaces that assist in redirecting light from the pedestrian) around the A-pillar P. It should be appreciated that cloaking of the A-pillar P with the cloaking device 19 and bypassing the blind spot produced by the A-pillar P is performed without the use of metamaterials, video images, cameras, sophisticated electronics, etc.

EXAMPLES

Figure 7A:
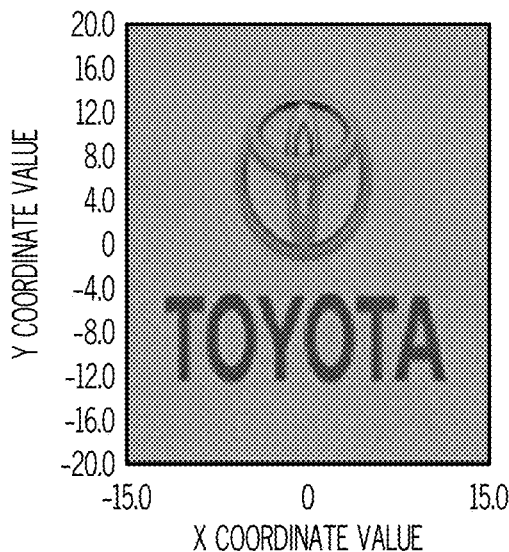
FIG. 7A depicts a computer simulated cloaking image for a cloaking assembly according to the embodiments of FIG. 1 with a 0° misalignment between an apex axis and a viewing angle the cloaking assembly.
Figure 7B:
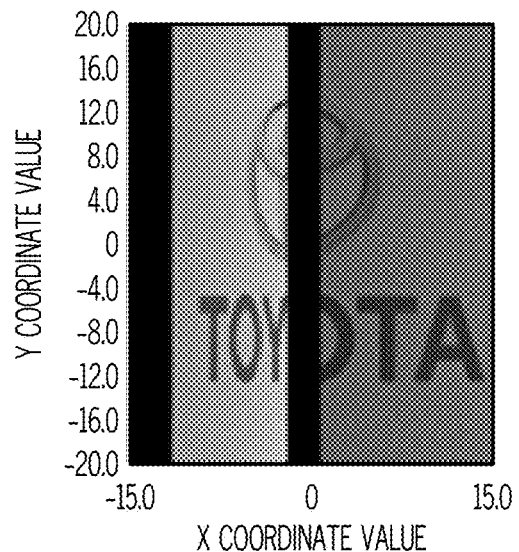
FIG. 7B depicts a computer simulated cloaking image for a cloaking assembly according to the embodiments of FIG. 1 with a 1° misalignment between an apex axis and a viewing angle the cloaking assembly.
Figure 7C:
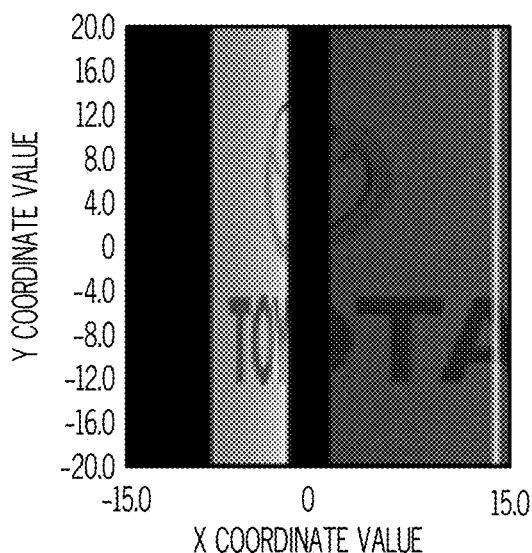
FIG. 7C depicts a computer simulated cloaking image for a cloaking assembly according to the embodiments of FIG. 1 with a 2° misalignment between an apex axis and a viewing angle the cloaking assembly.
Figure 7D:
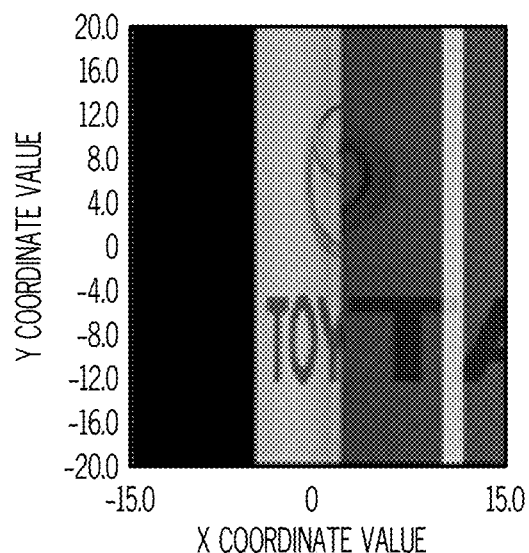
FIG. 7D depicts a computer simulated cloaking image for a cloaking assembly according to the embodiments of FIG. 1 with a 3° misalignment between an apex axis and a viewing angle the cloaking assembly.

Referring now to FIGS. 7A-7D, images of an object in the form of an emblem positioned on the object-side 12 of the cloaking assembly 10 and as viewed from the image-side 14 simulated using a commercial software program (Zemax OpticStudio) are depicted. The outward facing mirror surfaces 112, 122, 132, 142 were parabolic mirror surfaces obeying expression (2) with $y(x)=x^2/20$ and the inward facing mirror surfaces 152, 162, 172, 182 were parabolic mirror surfaces obeying the relationship $y(x)=x^2/6$. The corresponding focal lengths for outward facing mirror surfaces 112, 122, 132, 142 and the inward facing mirror surfaces 152, 162, 172, 182 were 5.0 mm and 1.5 mm, respectively. The aspect ratios for the entire device area and the hidden region were 0.77 and 1.0, respectively, with a cloaking ratio (i.e., hidden area/total device area) of about 39%. FIG. 7A depicts an image of the object with no misalignment (0°) between the apex axis 16 and a viewing angle of the cloaking assembly 10 from the +Y direction, i.e., an individual viewing the image I in the +Y direction along the apex axis 16. That is, as used herein, the term misalignment refers to an angle defined by the apex axis of a cloaking assembly and a line of sight of an observer viewing the cloaking assembly from the image-side as depicted by the +Y direction in the figures (also referred to herein as a "viewing angle"). FIG. 7B depicts an image of the object with a 1° misalignment between the apex axis 16 and a viewing angle of the cloaking assembly 10. FIG. 7C depicts an image of the object with a 2° misalignment between the apex axis 16 and a viewing angle of the cloaking assembly 10. FIG. 7D depicts an image of the object with a 3° misalignment between the apex axis 16 and a viewing angle of the cloaking assembly 10. As shown by the images in FIGS. 7A-7D, an image of an object on the object-side 12 of the cloaking assembly 10 can be seen clearly with up to 2° misalignment and is still visible with up to 3° of misalignment. Though not shown in FIGS. 7A-7D, it should be understood that an image of an object on the object-side 12 of the cloaking assembly 10 may be seen with up to 4° or 5° misalignment.

Figure 8A:
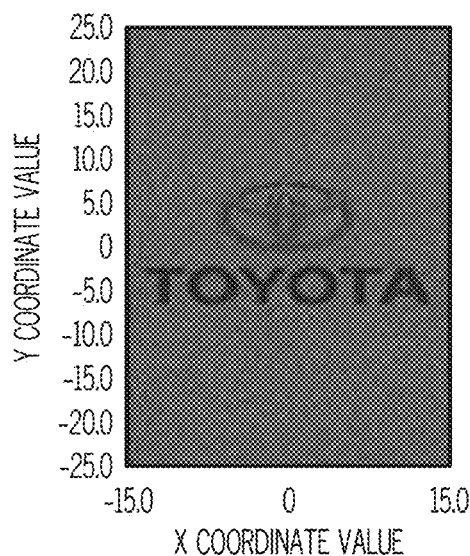
FIG. 8A depicts a computer simulated cloaking image for a cloaking assembly according to the embodiments of FIG. 2 with a 0° misalignment between an apex axis and a viewing angle the cloaking assembly.
Figure 8B:
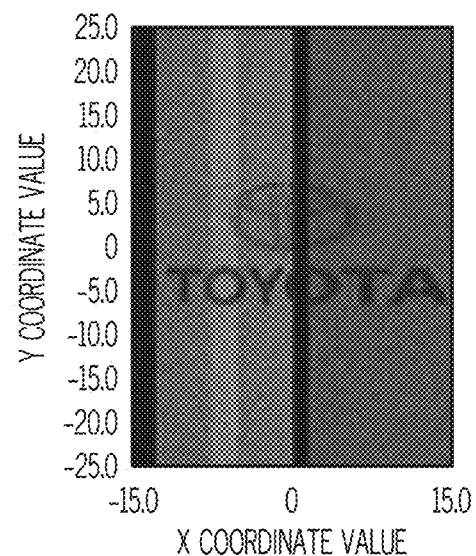
FIG. 8B depicts a computer simulated cloaking image for a cloaking assembly according to the embodiments of FIG. 2 with a 1° misalignment between an apex axis and a viewing angle the cloaking assembly.
Figure 8C:
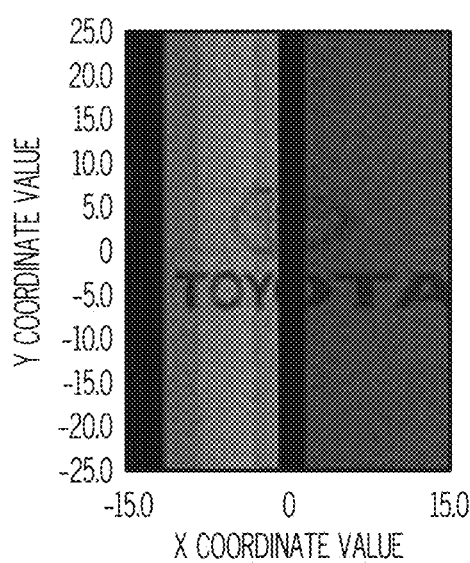
FIG. 8C depicts a computer simulated cloaking image for a cloaking assembly according to the embodiments of FIG. 2 with a 2° misalignment between an apex axis and a viewing angle the cloaking assembly.
Figure 8D:
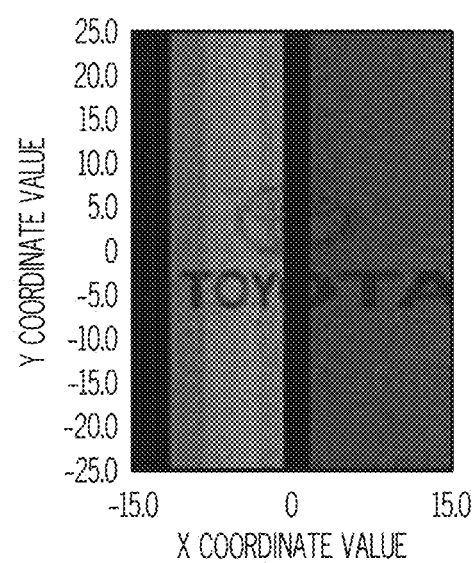
FIG. 8D depicts a computer simulated cloaking image for a cloaking assembly according to the embodiments of FIG. 2 with a 3° misalignment between an apex axis and a viewing angle the cloaking assembly.

Referring now to FIGS. 8A-8D, simulated images (Zemax OpticStudio) of an object in the form of an emblem positioned on the object-side 22 and as viewed from the image-side 24 of the cloaking assembly 20 are depicted. The outward facing mirror surfaces 212, 222, 232, 242 were parabolic mirror surfaces obeying the expression $y(x)=x^2/10$. The corresponding focal length for outer facing mirror surfaces 212, 222, 232, 242 was 2.5 mm. The aspect ratios for the entire device area and the hidden region were 0.53 and 0.37, respectively, with a cloaking ratio (i.e., hidden area/total device area) of about 35%. FIG. 8A depicts an image of the object with no misalignment (0°) between the apex axis 26 and a viewing angle of the cloaking assembly 20, FIG. 8B depicts an image of the object with a 1° misalignment between the apex axis 26 and a viewing angle of the cloaking assembly 20, FIG. 8C depicts an image of the object with a 2° misalignment between the apex axis 26 and a viewing angle of the cloaking assembly 20, and FIG. 8D depicts an image of the object with a 3° misalignment between the apex axis 26 and a viewing angle of the cloaking assembly 20. As shown by the images in FIGS. 8A-8D, an image of an object on the object-side 22 of the cloaking assembly 20 can be seen clearly with up to 1° of misalignment and is still visible with up to 3° of misalignment. Though not shown in FIGS. 8A-8D, it should be understood that an image of an object on the object-side 22 of the cloaking assembly 20 may be seen on the image-side 24 with up to 4° or 5° misalignment.

Figure 9A:
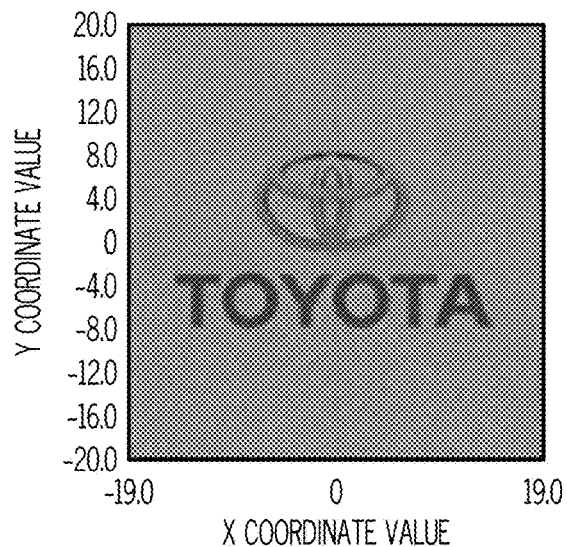
FIG. 9A depicts a computer simulated cloaking image for a cloaking assembly according to the embodiments of FIG. 3 with a 0° misalignment between an apex axis and a viewing angle the cloaking assembly.
Figure 9B:
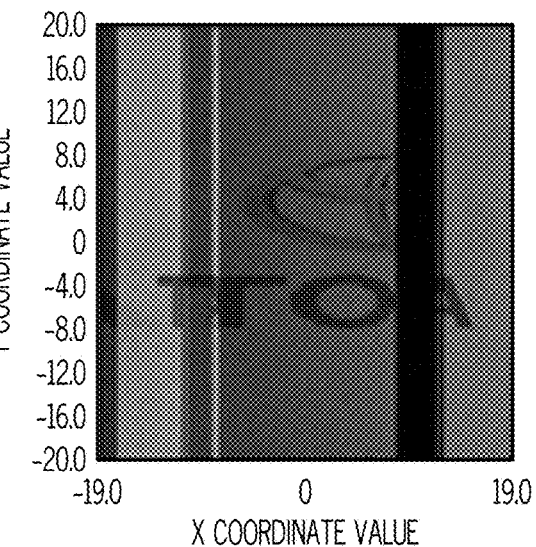
FIG. 9B depicts a computer simulated cloaking image for a cloaking assembly according to the embodiments of FIG. 3 with a 1° misalignment between an apex axis and a viewing angle the cloaking assembly.
Figure 9C:
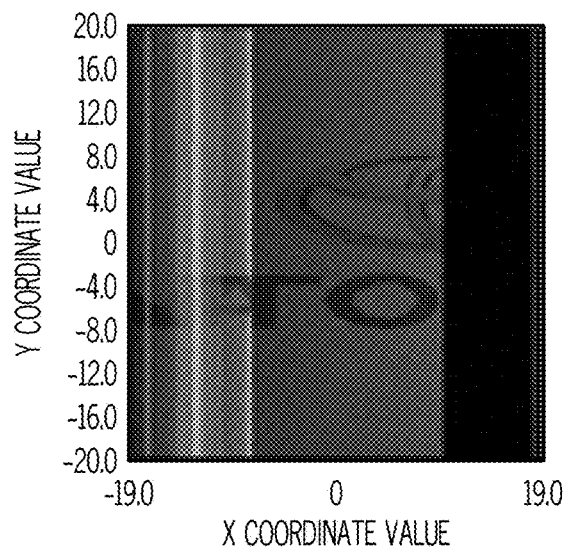
FIG. 9C depicts a computer simulated cloaking image for a cloaking assembly according to the embodiments of FIG. 3 with a 2° misalignment between an apex axis and a viewing angle the cloaking assembly.
Figure 9D:
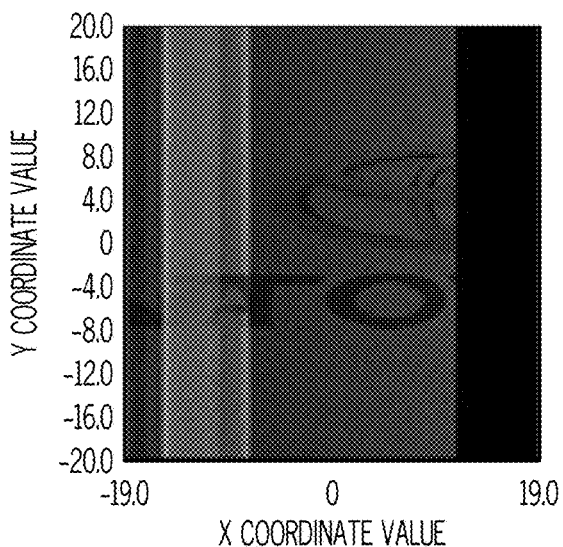
FIG. 9D depicts a computer simulated cloaking image for a cloaking assembly according to the embodiments of FIG. 3 with a 3° misalignment between an apex axis and a viewing angle the cloaking assembly.

Referring now to FIGS. 9A-9D, simulated images (ZeMax OpticStudio) of an object in the form of an emblem positioned on the object-side 32 and as viewed from the image-side 34 of the cloaking assembly 30 are depicted. The outward facing mirror surfaces 312, 322, 332, 342 were parabolic mirror surfaces obeying expression (2) with $y(x)=x^2/30$. The corresponding focal length for outward facing mirror surfaces 312, 322, 332, 342 was 7.5 mm. The aspect ratios for the entire device area and the hidden region were 0.94 and 0.72, respectively, with a cloaking ratio (i.e., hidden area/total device area) of about 38%. FIG. 9A depicts an image of the object with no misalignment (0°) between the apex axis 36 and a viewing angle of the cloaking assembly 30, FIG. 9B depicts an image of the object with a 1° misalignment between the apex axis 36 and a viewing angle of the cloaking assembly 30, FIG. 9C depicts an image of the object with a 2° misalignment between the apex axis 36 and a viewing angle of the cloaking assembly 30, and FIG. 9D depicts an image of the object with a 3° misalignment between the apex axis 36 and a viewing angle of the cloaking assembly 30. As shown by the images in FIGS. 9A-9D, an image of an object on the object-side 32 of the cloaking device can be seen clearly with up to 1° of misalignment and is still visible with up to 3° of misalignment. Though not shown in FIGS. 9A-9D, it should be understood that an image of an object on the object-side 32 of the cloaking assembly 30 may be seen on the image-side 34 with up to 4° or 5° misalignment. Also, increasing the length of the centrally positioned planar reflection boundaries 355, 357 may improve the angular performance of the cloaking assembly 30.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object," "article," and "item" may interchangeably refer to a visual object or image (2D or 3D) that reflects light or transmits light and the term "light from" may refer to "light reflected from" or "light transmitted from." The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking assembly with a CR bounded by four curved CR boundaries, cloaking assemblies with a CR bounded by two curved CR boundaries are provided. For example and without limitation, a cloaked region may be bounded between an object-side curved CR boundary and an image-side curved CR boundary. Also, the combination of curved CR boundaries and relative placement of the at least one exterior boundary enhances the misalignment tolerance such that an individual can see an object through a cloaked region with up to 3° of misalignment between an apex axis of the cloaking assembly and viewing of the cloaking assembly.

Directional terms as used herein—for example up, down, right, left, front, back, top, bottom, vertical, horizontal—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
    an object-side and an image-side;
    an object-side curved cloaking region (CR) boundary having an outward facing mirror surface and an inward facing surface and an image-side curved CR boundary having an outward facing mirror surface and an inward facing surface;
    a cloaked region bounded by the inward facing surfaces of the object-side curved CR boundary and the image-side curved CR boundary; and
    at least one exterior boundary comprising an inward facing mirror surface spaced apart from the object-side curved CR boundary and the image-side curved CR boundary;
    wherein light from an object positioned on the object-side of the cloaking device and obscured by the cloaked region is reflected by the object-side curved CR boundary, the at least one exterior boundary and the image-side curved CR boundary around the cloaked region to form an image of the object on the image-side of the cloaking device such that the light from the object appears to pass through the cloaked region,
    wherein the at least one exterior boundary comprises an object-side exterior curved boundary and an image-side exterior curved boundary, the object-side exterior curved boundary comprises an inward facing mirror surface positioned proximate to and facing the outward facing mirror surface of the object-side curved CR boundary and the image-side exterior curved boundary comprises an inward facing mirror surface positioned proximate to and facing the outward facing mirror surface of the image-side curved CR boundary,
    wherein the object-side curved CR boundary is oriented to focus incident light from the object positioned on the object side of the cloaking device onto a focal point located between the object-side curved CR boundary and the object-side exterior curved boundary, the object-side exterior curved boundary is oriented to reflect light parallel to the image-side exterior curved boundary, and the image-side exterior curved boundary is oriented to de-focus light to a focal point located between the image-side exterior curved boundary and the image-side curved CR boundary.

2. The cloaking device of claim 1, wherein the object-side curved CR boundary is oriented to reflect incident light from the object positioned on the object side of the cloaking device onto the object-side exterior curved boundary, the object-side exterior curved boundary is oriented to reflect light from the object-side curved CR boundary onto the image-side exterior curved boundary, the image-side exterior curved boundary is oriented to reflect light from the object-side exterior curved boundary onto the image-side curved CR boundary, and the image-side curved CR boundary is oriented to reflect light from the image-side exterior curved boundary and form the image of the object on the image-side of the cloaking device.

3. The cloaking device of claim 1, wherein the object-side curved CR boundary, image-side curved CR boundary, object-side exterior curved boundary and image-side exterior curved boundary comprise mirrors selected from the group consisting of concave mirrors and parabolic mirrors.

4. The cloaking device of claim 1, wherein the at least one exterior boundary comprises an exterior planar reflection boundary comprising an inward facing mirror surface facing the outward facing mirror surface of the object-side curved CR boundary and the outward facing mirror surface of the image-side curved CR boundary.

5. The cloaking device of claim 4, wherein the inward facing mirror surface of the exterior planar reflection boundary is parallel to an apex axis of the cloaking device.

6. The cloaking device of claim 4, wherein the object-side curved CR boundary is oriented to reflect incident light from the object positioned on the object side of the cloaking device to the exterior planar reflection boundary, the exterior planar reflection boundary is oriented to reflect light from the object-side curved CR boundary to the image-side curved CR boundary, and the image-side curved CR boundary is oriented to reflect light from the exterior planar reflection boundary and form the image of the object on the image-side of the cloaking device.

7. The cloaking device of claim 1, wherein the at least one exterior boundary comprises an object-side exterior planar reflection boundary, an image-side exterior planar reflection boundary and a centrally positioned planar reflection boundary, wherein the object-side exterior planar reflection boundary comprises an inward facing mirror surface positioned proximate to and facing the outward facing mirror surface of the object-side curved CR boundary, the image-side exterior planar reflection boundary comprises an inward facing mirror surface positioned proximate to and facing the outward facing mirror surface of the image-side curved CR boundary, and the centrally positioned planar reflection boundary comprises an outward facing mirror surface positioned between and facing the inward facing mirror surfaces of the object-side and image-side exterior planar reflection boundaries.

8. The cloaking device of claim 7, wherein the outward facing mirror surface of the centrally positioned planar reflection boundary is parallel to an apex axis of the cloaking device.

9. The cloaking device of claim 7, wherein the object-side curved CR boundary is oriented to reflect incident light from the object positioned on the object side of the cloaking device onto the object-side exterior planar reflection boundary, the object-side exterior planar reflection boundary is oriented to reflect light from the object-side curved CR boundary onto the centrally positioned planar reflection boundary, the centrally positioned planar reflection boundary is oriented to reflect light from the object-side exterior planar reflection boundary onto the image-side exterior planar reflection boundary, the image-side exterior planar reflection boundary is oriented to reflect light from the centrally positioned planar reflection boundary onto the image-side curved CR boundary, and the image-side curved CR boundary is oriented to reflect light from the image-side exterior planar reflection boundary and form the image of the object on the image-side of the cloaking device.

10. A cloaking device assembly comprising:
an object-side and an image-side;
a pair of object-side curved cloaking region (CR) boundaries, each of the pair of object-side curved CR boundaries comprising an outward facing mirror surface and an inward facing surface;
a pair of image-side curved CR boundaries, each of the pair of image-side curved CR boundaries comprising an outward facing mirror surface and an inward facing surface;
a cloaked region bounded by the inward facing surfaces of the pair of object-side curved CR boundaries and the pair of image-side curved CR boundaries;
a cloaked object positioned within the cloaked region; and
at least one pair of exterior boundaries, each of the at least one pair of exterior boundaries comprising an inward facing mirror surface spaced apart from one of the pair of object-side curved CR boundaries and one of the pair of image-side curved CR boundaries;
wherein light from an object positioned on the object-side of the cloaking device assembly and obscured by the cloaked region is reflected by the pair of object-side curved CR boundaries, the at least one pair of exterior boundaries and the pair of image-side curved CR boundaries around the cloaked region to form an image of the object on the image-side of the cloaking device assembly such that the light from the object appears to pass through the cloaked region,
wherein the at least one pair of exterior boundaries comprise a pair of object-side exterior curved boundaries and a pair of image-side exterior curved boundaries, each of the pair of object-side exterior curved boundaries comprising an inward facing mirror surface positioned proximate to and facing one of the outward facing mirror surfaces of the pair of object-side curved CR boundaries and each of the pair of image-side exterior curved boundaries comprising an inward facing mirror surface positioned proximate to and facing one of the outward facing mirror surfaces of the pair of image-side curved CR boundaries,
wherein the pair of object-side curved CR boundaries are oriented to focus incident light from the object positioned on the object side of the cloaking device onto a focal point located between the pair of object-side curved CR boundaries and the pair of object-side exterior curved boundaries, the pair of object-side exterior curved boundaries are oriented to reflect light parallel to the pair of image-side exterior curved boundaries, and the pair of image-side exterior curved boundaries are oriented to de-focus light to a focal point located between the pair of image-side exterior curved boundaries and the pair of image-side curved CR boundaries.

11. The cloaking device assembly of claim 10, wherein the pair of object-side curved CR boundaries are oriented to reflect incident light from the object positioned on the object side of the cloaking device assembly to the pair of object-side exterior curved boundaries, the pair of object-side exterior curved boundaries are oriented to reflect light from the pair of object-side curved CR boundaries onto the pair of image-side exterior curved boundaries, the pair of image-side exterior curved boundaries oriented to reflect light from the pair of object-side exterior curved boundaries to the pair of image-side curved CR boundaries, and the pair of image-side curved CR boundaries oriented to reflect light from the pair of object-side exterior curved boundaries and form the image of the object on the image-side of the cloaking device assembly.

12. The cloaking device assembly of claim 10, wherein the at least one pair of exterior boundaries comprise a pair of exterior planar reflection boundaries and each of the pair of exterior planar reflection boundaries comprise an inward facing mirror surface facing one of the outward facing mirror surfaces of the pair of object-side curved CR boundaries and one of the outward facing mirror surfaces of the pair of image-side curved CR boundaries.

13. The cloaking device assembly of claim 10, wherein the at least one pair of exterior boundaries comprise a pair of object-side exterior planar reflection boundaries, a pair of image-side exterior planar reflection boundaries and a pair of centrally positioned planar reflection boundaries, wherein each of the pair of object-side exterior planar reflection boundaries comprise an inward facing mirror surface positioned proximate to and facing one of the outward facing mirror surfaces of the pair of object-side curved CR boundaries, each of the pair of image-side exterior planar reflection boundaries comprise an inward facing mirror surface positioned proximate to and facing one of the outward facing mirror surfaces of the pair of image-side curved CR boundaries, and each of the pair of centrally positioned planar reflection boundaries comprise an outward facing mirror surface positioned between and facing one of the inward facing mirror surfaces of the pair of object-side exterior planar reflection boundaries and pair of image-side exterior planar reflection boundaries.

14. A cloaking device and pillar assembly on a vehicle comprising:
an A-pillar;
a cloaking assembly comprising:
object-side and an image-side;
an object-side curved cloaking region (CR) boundary having an outward facing mirror surface and an inward facing surface and an image-side curved CR boundary an outward facing mirror surface and an inward facing surface;
a cloaked region bounded by the inward facing surfaces of the object-side curved CR boundary and the image-side curved CR boundary, wherein the A-pillar is positioned within the cloaked region; and
at least one exterior boundary comprising an inward facing mirror surface spaced apart from the object-side curved CR boundary and the image-side curved CR boundary;
wherein light from an object positioned on the object-side of the cloaking device and obscured by the cloaked region is reflected by the object-side curved CR boundary, the at least one exterior boundary and the image-side curved CR boundary around the A-pillar to form an image of the object on the image-side of the cloaking device such that the light from the object appears to pass through the A-pillar,
wherein the at least one exterior boundary comprises an object-side exterior curved boundary and an image-side exterior curved boundary, the object-side exterior curved boundary comprises an inward facing mirror surface positioned proximate to and facing the outward facing mirror surface of the object-side curved CR boundary and the image-side exterior curved boundary comprises an inward facing mirror surface positioned proximate to and facing the outward facing mirror surface of the image-side curved CR boundary,
wherein the object-side curved CR boundary is oriented to focus incident light from the object positioned on the object side of the cloaking device onto a focal point located between the object-side curved CR boundary and the object-side exterior curved boundary, the object-side exterior curved boundary is oriented to reflect light parallel to the image-side exterior curved boundary, and the image-side exterior curved boundary is oriented to de-focus light to a focal point located between the image-side exterior curved boundary and the image-side curved CR boundary.

15. The cloaking device of claim 14, wherein the at least one exterior boundary comprises an exterior planar reflection boundary comprising an inward facing mirror surface facing the outward facing mirror surface of the object-side curved CR boundary and the outward facing mirror surface of the image-side curved CR boundary.

16. The cloaking device of claim 14, wherein the at least one exterior boundary comprises an object-side exterior planar reflection boundary, an image-side exterior planar reflection boundary and a centrally positioned planar reflection boundary, wherein the object-side exterior planar reflection boundary comprises an inward facing mirror surface positioned proximate to and facing the outward facing mirror surface of the object-side curved CR boundary, the image-side exterior planar reflection boundary comprises an inward facing mirror surface positioned proximate to and facing the outward facing mirror surface of the image-side curved CR boundary, and the centrally positioned planar reflection boundary comprises an outward facing mirror surface positioned between and facing the inward facing mirror surfaces of the object-side and image-side exterior planar reflection boundaries.

* * * * *

UNITED STATES PATENT AND TRADEMARK OFFICE
CERTIFICATE OF CORRECTION

PATENT NO. : 10,754,133 B2
APPLICATION NO. : 15/660007
DATED : August 25, 2020
INVENTOR(S) : Kyu-Tae Lee and Debasish Banerjee Page 1 of 1

It is certified that error appears in the above-identified patent and that said Letters Patent is hereby corrected as shown below:

In the Specification

Column 8, Line(s) 10, Equation 1, delete "$X^2/\ R(1+\sqrt{1}-(1+K)(K^2/R^2)$" and insert --$X^2/\ R(1+\sqrt{1}-(1+K)(K^2/R^2))$--, therefor.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*